United States Patent
Bae et al.

(10) Patent No.: US 10,520,661 B2
(45) Date of Patent: Dec. 31, 2019

(54) BACKLIGHT UNIT, DISPLAY DEVICE INCLUDING THE SAME, AND METHOD OF FABRICATING THE BACKLIGHT UNIT

(71) Applicant: Samsung Display Co., Ltd., Yongin-Si, Gyeonggi-Do (KR)

(72) Inventors: Kwangsoo Bae, Suwon-si (KR); Donchan Cho, Seongnam-si (KR); Pilsook Kwon, Incheon (KR); Jungsuk Bang, Seoul (KR); Minjeong Oh, Gimpo-si (KR); Haeju Yun, Hwaseong-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 369 days.

(21) Appl. No.: 15/629,826

(22) Filed: Jun. 22, 2017

(65) Prior Publication Data
US 2018/0011235 A1 Jan. 11, 2018

(30) Foreign Application Priority Data

Jul. 6, 2016 (KR) .......................... 10-2016-0085679

(51) Int. Cl.
F21V 8/00 (2006.01)

(52) U.S. Cl.
CPC ........... *G02B 6/005* (2013.01); *G02B 6/0035* (2013.01); *G02B 6/0065* (2013.01); *G02B 6/0053* (2013.01); *G02B 6/0055* (2013.01)

(58) Field of Classification Search
CPC ..... G02B 6/005; G02B 6/0035; G02B 6/0065
USPC ....................................................... 362/606
See application file for complete search history.

(56) References Cited

U.S. PATENT DOCUMENTS

| | | | | |
|---|---|---|---|---|
| 6,011,602 A * | 1/2000 | Miyashita | ............ | G02B 6/0038 349/65 |
| 8,979,349 B2 * | 3/2015 | Bita | ...................... | G02B 6/0036 362/615 |
| 2007/0183038 A1 * | 8/2007 | Hwang | ................ | G02B 6/0038 359/487.02 |
| 2010/0020567 A1 * | 1/2010 | Tatehata | ............... | G02B 6/0036 362/606 |
| 2010/0177535 A1 * | 7/2010 | Sato | ................... | G02F 1/133605 362/606 |

(Continued)

FOREIGN PATENT DOCUMENTS

| | | |
|---|---|---|
| KR | 2020110001778 U | 2/2011 |
| KR | 10-1385482 B1 | 4/2014 |
| KR | 1020140042733 A | 4/2014 |

*Primary Examiner* — Bryon T Gyllstrom
(74) *Attorney, Agent, or Firm* — Cantor Colburn LLP

(57) ABSTRACT

A backlight unit includes a light source generating light, a light guide plate guiding the light in an upper direction, and an optical member disposed on the light guide plate to condense the light provided from the light guide plate in the upper direction. A top surface of the light guide plate includes a plurality of circular areas and a peripheral area around the circular areas. Each of the circular areas includes a central circular area and a ring area surrounding the central circular area. The optical member includes a first insulating layer disposed on the light guide plate and spaced apart from the light guide plate by predetermined distances in the ring areas and the peripheral area to define a plurality of cavities, and a second insulating layer disposed on the first insulating layer.

20 Claims, 13 Drawing Sheets

(56) References Cited

U.S. PATENT DOCUMENTS

| | | | |
|---|---|---|---|
| 2012/0133575 A1* | 5/2012 | Hasegawa | H01L 51/5265 345/76 |
| 2013/0088847 A1* | 4/2013 | Tatehata | G02B 6/006 362/23.05 |
| 2014/0034919 A1* | 2/2014 | Park | H01L 51/5275 257/40 |
| 2015/0355505 A1* | 12/2015 | Overes | G02F 1/133603 349/62 |
| 2016/0077273 A1* | 3/2016 | Kim | G02B 6/0051 362/633 |
| 2016/0077328 A1* | 3/2016 | Chong | G02B 26/02 349/62 |
| 2016/0127719 A1* | 5/2016 | Jeon | H04N 13/31 348/54 |
| 2018/0196302 A1* | 7/2018 | Bae | G02B 6/005 |

\* cited by examiner

BACKLIGHT UNIT, DISPLAY DEVICE INCLUDING THE SAME, AND METHOD OF FABRICATING THE BACKLIGHT UNIT

This application claims priority to Korean Patent Application No. 10-2016-0085679, filed on Jul. 6, 2016, and all the benefits accruing therefrom under 35 U.S.C. § 119, the content of which in its entirety is herein incorporated by reference.

BACKGROUND

(1) Field

Embodiments of the invention relate to a backlight unit, a display device including the same, and a method of fabricating the backlight unit.

(2) Description of the Related Art

Generally, a display device includes a display panel displaying an image by using light and a backlight unit which generates the light and provides the light to the display panel. The display panel includes a first substrate in which a plurality of pixels is disposed, a second substrate facing the first substrate, and an image display layer disposed between the first and second substrates. The backlight unit may be an edge-type backlight unit for which a light source is disposed at a side portion of the display device to generate light.

The image display layer may be driven by the pixels, and a transmittance of light provided from the backlight unit to the display panel may be controlled by the image display layer to display an image. The image display layer may be a liquid crystal layer, an electrowetting layer or an electrophoretic layer.

The edge-type backlight unit includes a light source which generates light, a light guide plate which guides the light provided from the light source in an upper direction toward the display panel, and an optical sheet disposed between the light guide plate and the display panel. The optical sheet may condense light provided from the light guide plate in the upper direction and may provide the condensed light to the display panel.

SUMMARY

Embodiments of the invention may provide a backlight unit capable of improving light-emitting efficiency thereof and of reducing a total thickness thereof, a display device including the same, and a method of fabricating the backlight unit.

In an embodiment, a backlight unit includes a light source generating light, a light guide plate guiding the light in an upper direction toward a display panel which displays an image with the light, and an optical member disposed on the light guide plate to condense the light provided from the light guide plate in the upper direction. In a top plan view, a top surface of the light guide plate includes a plurality of circular areas and a peripheral area around the circular areas, and each of the circular areas includes a central circular area and a ring area surrounding the central circular area. The optical member includes a first insulating layer disposed on the light guide plate, the first insulating layer spaced apart from the light guide plate by a predetermined distance at the ring areas and at the peripheral area to define a plurality of cavities, and a second insulating layer disposed on the first insulating layer.

The first insulating layer spaced apart from the top surface of the light guide plate at the ring areas and at the peripheral area thereof may extend toward the light guide plate to be in contact with the top surface of the light guide plate in the central circular areas.

The first insulating layer may include an inorganic material, the second insulating layer may include an organic material, and a top surface of the second insulating layer may be flat.

A plurality of holes may penetrate the first insulating layer at predetermined areas of the peripheral area, and the second insulating layer disposed on the first insulating layer may commonly covers the plurality of holes which penetrates the first insulating layer.

In the top plan view, the circular areas may be arranged in a first direction and a second direction intersecting the first direction.

In a plane is defined by the first and second directions, a first diagonal direction may form an angle of about 45 degrees with the first direction in a counterclockwise direction, and a second diagonal direction may form an angle of about 135 degrees with the first direction in the counterclockwise direction. The holes may penetrate the first insulating layer in first predetermined areas and second predetermined areas. Each of the first predetermined areas may be defined in a central area between ring areas adjacent to each other in the first diagonal direction, and each of the second predetermined areas may be defined in a central area between the ring areas adjacent to each other in the second diagonal direction.

The first insulating layer spaced apart from the top surface of the light guide plate may include an inclined surface forming a predetermined angle with the top surface of the light guide plate in each of the ring areas.

The inclined surface may form an angle of about 60 degrees to about 70 degrees with the top surface of the light guide plate.

A diameter of each of the holes may be greater than 0 micrometer and smaller than about 5 micrometers.

A viscosity of the second insulating layer may be equal to or greater than about 200 centipoise (cP).

A refractive index of the light guide plate may be greater than a refractive index of the plurality of the cavities and equal to a refractive index of the second insulating layer, and a refractive index of the first insulating layer may be greater than the refractive index of the second insulating layer.

A total thickness of the optical member inclusive of the first and second insulating layers may be equal to or greater than about 3.5 micrometers and equal to or smaller than about 10 micrometers.

In an embodiment, a display device includes a display panel displaying an image by using light, and a backlight unit which provides the light to the display panel. The backlight unit includes a light source generating the light, a light guide plate guiding the light in an upper direction toward the display panel, and an optical member disposed on the light guide plate to condense the light provided from the light guide plate in the upper direction. In a top plan view, a top surface of the light guide plate includes a plurality of circular areas and a peripheral area around the circular areas, and each of the circular areas includes a central circular area and a ring area surrounding the central circular area. The optical member includes a first insulating layer disposed on the light guide plate, the first insulating layer spaced apart from the light guide plate by a predetermined distance at the ring areas and at the peripheral area to define a plurality of cavities, the first insulating layer being in contact with the top surface of the light guide plate in the central circular areas, and a second insulating layer disposed on the first insulating layer.

In an embodiment, a method of fabricating a backlight unit includes preparing a light guide plate including a plurality of central circular areas, a plurality of first ring areas respectively surrounding the central circular areas, a plurality of second ring areas respectively surrounding the first ring areas, and a peripheral area around the second ring areas, forming a first photoresist pattern on the light guide plate in the second ring areas and in the peripheral area, applying a temperature of about 130 degrees Celsius to about 149 degrees Celsius to the first photoresist pattern in the second ring areas to form an inclined surface of the first photoresist pattern extended from the peripheral area to be disposed in the first and second ring areas, the inclined surface exposing a top surface of the light guide plate, forming a first insulating layer on the exposed top surface of the light guide plate, on the first photoresist pattern in the peripheral area and on the inclined surface of the photoresist pattern in the first and second ring areas, removing portions of the first insulating layer in predetermined areas of the peripheral area to define a plurality of holes in the first insulating layer which expose the first photoresist pattern under the first insulating layer, providing an etching solution to the first photoresist pattern through the holes to remove the first photoresist pattern and form a plurality of cavities under the first insulating layer, and forming a second insulating layer on the first insulating layer to commonly cover the holes in the first insulating layer. The first insulating layer is spaced apart from the light guide plate by a predetermined distance in the first and second ring areas and the peripheral area to define the plurality of cavities, and the first insulating layer spaced apart from the light guide plate at the first and second ring areas and at the peripheral area extends toward the light guide plate to be in contact with the exposed top surface of the light guide plate in the central circular areas thereof.

BRIEF DESCRIPTION OF THE DRAWINGS

The invention will become more apparent in view of the attached drawings and accompanying detailed description.

FIG. 7 is a top plan view and FIGS. 8A to 14A, and 8B to 14B are cross-sectional views illustrating an embodiment of a method of fabricating a backlight unit, according to the invention.

DETAILED DESCRIPTION

Figure 1:
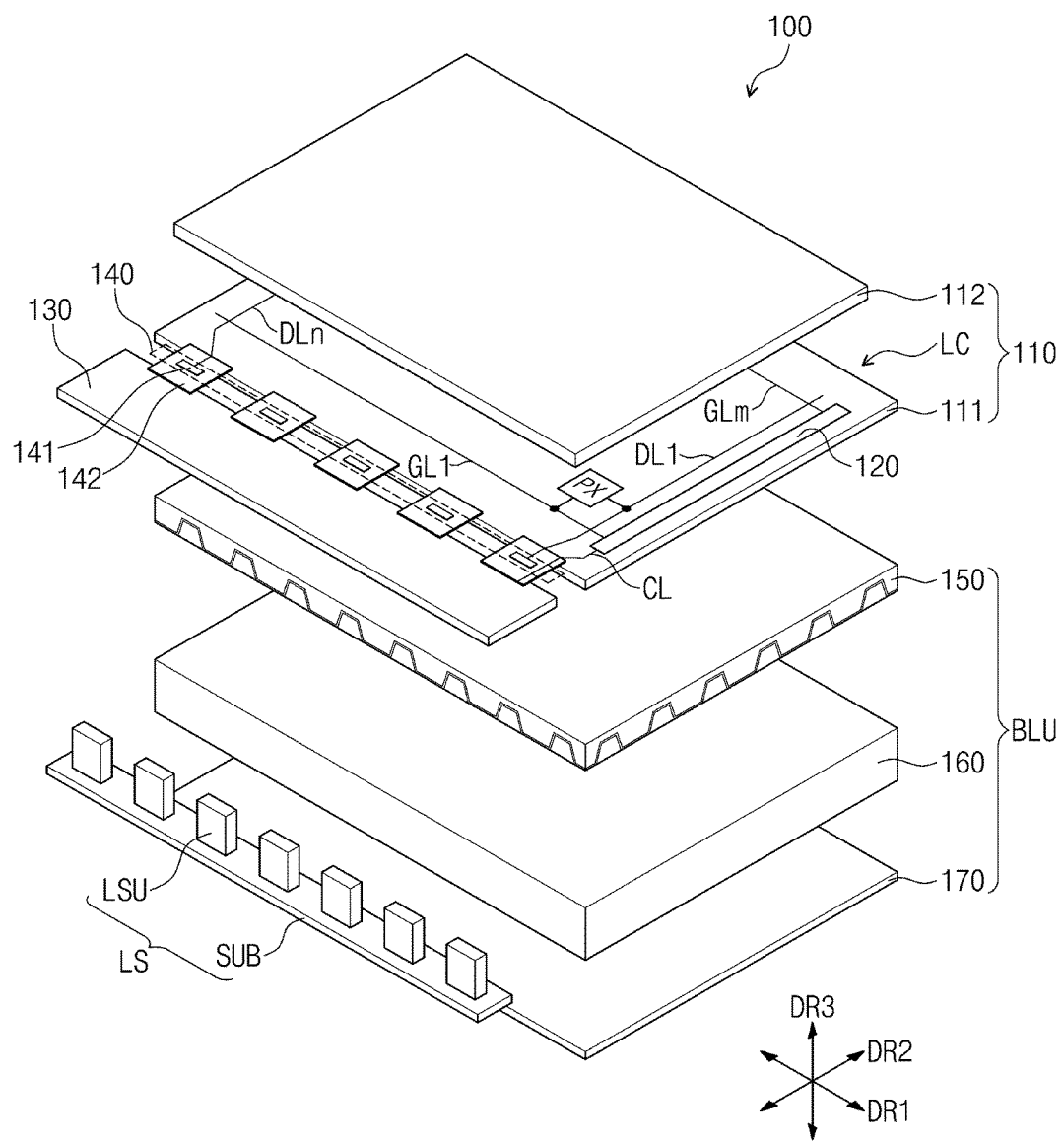
FIG. 1 is a perspective view illustrating an embodiment of a display device including a backlight assembly according to the invention.

The invention will now be described more fully hereinafter with reference to the accompanying drawings, in which exemplary embodiments of the invention are shown. The advantages and features of the invention and methods of achieving them will be apparent from the following exemplary embodiments that will be described in more detail with reference to the accompanying drawings. It should be noted, however, that the invention is not limited to the following exemplary embodiments, and may be implemented in various forms. Accordingly, the exemplary embodiments are provided only to disclose the invention and let those skilled in the art know the category of the invention. In the drawings, embodiments of the invention are not limited to the specific examples provided herein and are exaggerated for clarity. Like reference numerals refer to like elements throughout.

It will be understood that when an element such as a layer, region or substrate is referred to as being "on" or related to another element, it can be directly on or related the other element or intervening elements may be present. In contrast, the term "directly" when describing one element relative to another means that there are no intervening elements.

The terminology used herein is for the purpose of describing particular embodiments only and is not intended to be limiting. As used herein, the singular forms "a," "an," and "the" are intended to include the plural forms, including "at least one," unless the content clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the invention.

Moreover, exemplary embodiments are described herein with reference to cross-sectional illustrations and/or plane illustrations that are idealized exemplary illustrations. In the drawings, the thicknesses of layers and regions are exaggerated for clarity. Accordingly, variations from the shapes of the illustrations as a result, for example, of manufacturing techniques and/or tolerances, are to be expected. Thus, exemplary embodiments should not be construed as limited to the shapes of regions illustrated herein but are to include deviations in shapes that result, for example, from manufacturing. For example, an etching region illustrated as a rectangle will, typically, have rounded or curved features. Thus, the regions illustrated in the figures are schematic in nature and their shapes are not intended to illustrate the actual shape of a region of a device and are not intended to limit the scope of embodiments.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

An optical sheet within a backlight unit of a display device may include a diffusion sheet diffusing light, a prism sheet disposed on the diffusion sheet to condense light and/or a protection sheet disposed on the prism sheet to protect the prism sheet. Generally, the optical sheet including a plurality of individual sheets may have a total thickness of 0.5 millimeter (mm), and an overall thickness of the display device may be relatively thick by the optical sheet including the collection of individual sheets. Therefore, an improved backlight unit capable of increasing light-emitting efficiency thereof and of reducing a total thickness thereof are desired.

Hereinafter, embodiments of the invention will be described in more detail with reference to the accompanying drawings.

FIG. 1 is a perspective view illustrating an embodiment of a display device including a backlight assembly according to the invention.

Referring to FIG. 1, an embodiment of a display device 100 according to the invention includes a display panel 110, a gate driving unit 120, a printed circuit board 130, a data driving unit 140, and a backlight unit BLU. The display panel 110 may have a relatively long side parallel to a first direction DR1 and may have a relatively short side parallel to a second direction DR2 intersecting the first direction DR1. The display panel 110 may be disposed in a plane parallel to a plane defined by the first and second directions DR1 and DR2.

The backlight unit BLU generates light and condenses the generated light to provide the condensed light to the display panel 110. The display panel 110 displays an image by using light provided from the backlight unit BLU. The display panel 110 and/or the display device 100 includes a display area at which the image is generated and displayed, and a non-display area at which the image is not displayed.

The display panel 110 includes a first display substrate including a first (base) substrate 111, a second display substrate including a second (base) substrate 112 facing the first substrate 111, and an image display layer such as a liquid crystal layer LC disposed between the first substrate 111 and the second substrate 112. A pixel PX, a plurality of gate lines GL1 to GLm, and a plurality of data lines DL1 to DLn are disposed on the first substrate 111. The pixel PX is disposed in the display area. Here, 'm' and 'n' are natural numbers. One pixel is illustrated in FIG. 1 for the purpose of ease and convenience in explanation and illustration. However, the pixel PX may be disposed in plurality on the first substrate 111.

The gate lines GL1 to GLm are insulated from the data lines DL1 to DLn and intersect the data lines DL1 to DLn in the top plan view. The gate lines GL1 to GLm and the data lines DL1 are disposed in the display area and may extend therefrom to terminate in the non-display area. The gate lines GL1 to GLm define lengths thereof which are larger than widths thereof and extend in the first direction DR1 so as to be connected to the gate driving unit 120 at terminal ends of the gate lines GL1 to GLm. The data lines DL1 to DLn define lengths thereof which are larger than widths thereof and extend in the second direction DR2 so as to be connected to the data driving unit 140 at terminal ends of the data lines DL1 to DLn.

In an embodiment, the pixels PX may correspond to areas divided by the gate lines GL1 to GLm and the data lines DL1 to DLn which intersect the gate lines GL1 to GLm, but the invention is not limited thereto. The pixels PX are arranged in a matrix form in the top plan view and are connected to the gate lines GL1 to GLm and the data lines DL1 to DLn, respectively.

The gate driving unit 120 is disposed in a predetermined area of the first substrate 111, which is adjacent to a side of the first substrate 111 among sides thereof opposing each other in the first direction DR1. In a method of manufacturing the display panel 110, layers and/or elements of the gate driving unit 120 may be formed simultaneously with layers and/or elements of the pixels PX such as transistors of the pixels PX, by the same processes. In the method, the gate driving unit 120 may be mounted on the first substrate 111 in an amorphous silicon thin film transistor ("TFT") gate driver circuit ("ASG") form or an oxide silicon TFT gate driver circuit ("OSG") form.

However, embodiments of the invention are not limited thereto. In certain embodiments, the gate driving unit 120 may be formed in a tape carrier package ("TCP") type so as to be connected to the first substrate 111. The tape carrier package may include a flexible printed circuit board and a plurality of driving chips which are mounted on the flexible printed circuit board. Alternatively, the gate driving unit 120 may include a plurality of driving chips and may be mounted in the first substrate 111 in a chip-on-glass ("COG") type.

A timing controller (not shown) is disposed on the printed circuit board 130. The timing controller may be mounted in an integrated circuit chip type on the printed circuit board 130 so as to be connected to the gate driving unit 120 and/or the data driving unit 140. The timing controller outputs a gate control signal, a data control signal and/or image data to be used in driving or controlling the display panel 110 to display the image.

The gate driving unit 120 receives the gate control signal from the timing controller through a control line CL. The gate driving unit 120 may generate a plurality of gate signals in response to the gate control signal and may sequentially output the gate signals to the display panel 110. The gate signals are provided to the pixels PX within the display panel 110 through the gate lines GL1 to GLm in the unit of (a pixel) row. Thus, the pixels PX may be driven in the unit of row.

The data driving unit 140 includes a source driving chip 141. The source driving chip 141 is mounted on a flexible circuit board 142 and is connected to the printed circuit board 130 and to a predetermined area of the first substrate 111 adjacent to a side of the first substrate 111 in the second direction DR2 among sides opposing each other in the second direction DR2. In other words, the data driving unit 140 is connected to the first substrate 111 and the printed circuit board 130 in a tape carrier package (TCP) type. However, embodiments of the invention are not limited thereto. The source driving chip 141 and the flexible circuit board 142 may be provided in plurality within the data driving unit 140. In certain embodiments, the source driving chips 141 of the data driving unit 140 may be mounted on the first substrate 111 in a chip-on-glass ("COG") type.

The data driving unit 140 receives the image data and the data control signal from the timing controller. The data driving unit 140 generates and outputs analog data voltages corresponding to the image data in response to the data control signal. The data voltages are provided to the pixels PX within the display panel 110 through the data lines DL1 to DLn.

The pixels PX receive the data voltages through the data lines DL1 to DLn of which portions thereof area disposed in the display area in response to the gate signals provided through the gate lines GL1 to GLm of which portions thereof area disposed in the display area. The pixels PX may display gray scales corresponding to the data voltages, thereby displaying an image within the display area.

The backlight unit BLU may be an edge-type backlight unit. The backlight unit BLU includes an optical member 150, a light guide plate 160, a light source LS (member or unit) and a reflection sheet 170. The optical member 150, the light guide plate 160 and the reflection sheet 170 each have or define relatively long sides parallel to the first direction DR1 and relatively short sides parallel to the second direction DR2.

The optical member 150 is disposed under the display panel 110, the light guide plate 160 is disposed under the optical member 150, and the reflection sheet 170 is disposed under the light guide plate 160, in a cross-sectional (thickness) direction of the display device 100. The light source LS may define a length thereof larger than a width thereof and extending in the first direction DR1. The light source LS may be disposed to be adjacent to one side surface of the light guide plate 160 among two opposing side surfaces thereof in the second direction DR2.

The light guide plate 160 may include glass. However, embodiments of the invention are not limited thereto. In certain embodiments, the light guide plate 160 may include a plastic material such as polymethylmethacrylate ("PMMA"). The one side surface of the light guide plate 160 among the two opposing side surfaces thereof in the second direction DR2 at which the light source LS is disposed may be defined as a light incident surface, and light generated from the light source LS is provided to the one side surface of the light guide plate 160. The light guide plate 160 guides the light provided from the light source LS in an upper direction toward the display panel 110. The guided light exits from the light guide plate 160 through a light exiting surface which faces the display panel 110. The light guide plate 160 further includes a bottom surface opposite to the light exiting surface, and multiple side surfaces which connect the light exiting and bottom surfaces to each other.

The light incident surface of the light guide plate 160 may be one of the side surfaces which connect the light exiting and bottom surfaces to each other.

The light source LS includes a light source substrate SUB lengthwise extending in the first direction DR1 and a light source unit LSU mounted on the light source substrate SUB. The light source unit LSU may be provided in plurality on the light source substrate SUB. The light source units LSU are arranged at equal intervals along the length of the light source substrate USB, that is, in the first direction DR1. The light source units LSU are disposed to face the one side surface of the light guide plate 160 among the two opposing side surfaces thereof in the second direction DR2. The light source units LSU generate light, and the light generated from the light source units LSU is provided to the one side surface of the light guide plate 160.

The reflection sheet 170 reflects light, which is outputted through the bottom surface of the light guide plate 160, in the upper direction toward the display panel 110.

The optical member 150 may condense light, which is provided from the light guide plate 160, in the upper direction intersecting a plane parallel to a plane defined in the first direction DR1 and the second direction DR2. Light passing through the optical member 150 may travel in the upper direction toward the display panel 110 so as to be provided to the display panel 110 with a uniform brightness distribution.

A direction perpendicularly intersecting the plane parallel to the first and second directions DR1 and DR2 may be defined as a third direction DR3 (or a normal direction). A cross-sectional thickness of the optical member 150 in the third direction DR3 may be equal to or greater than about 3.5 micrometers (μm) and equal to or less than about 10 micrometers (μm). Elements of the optical member 150 will be described later in more detail with reference to FIGS. 3 to 5.

Figure 2:
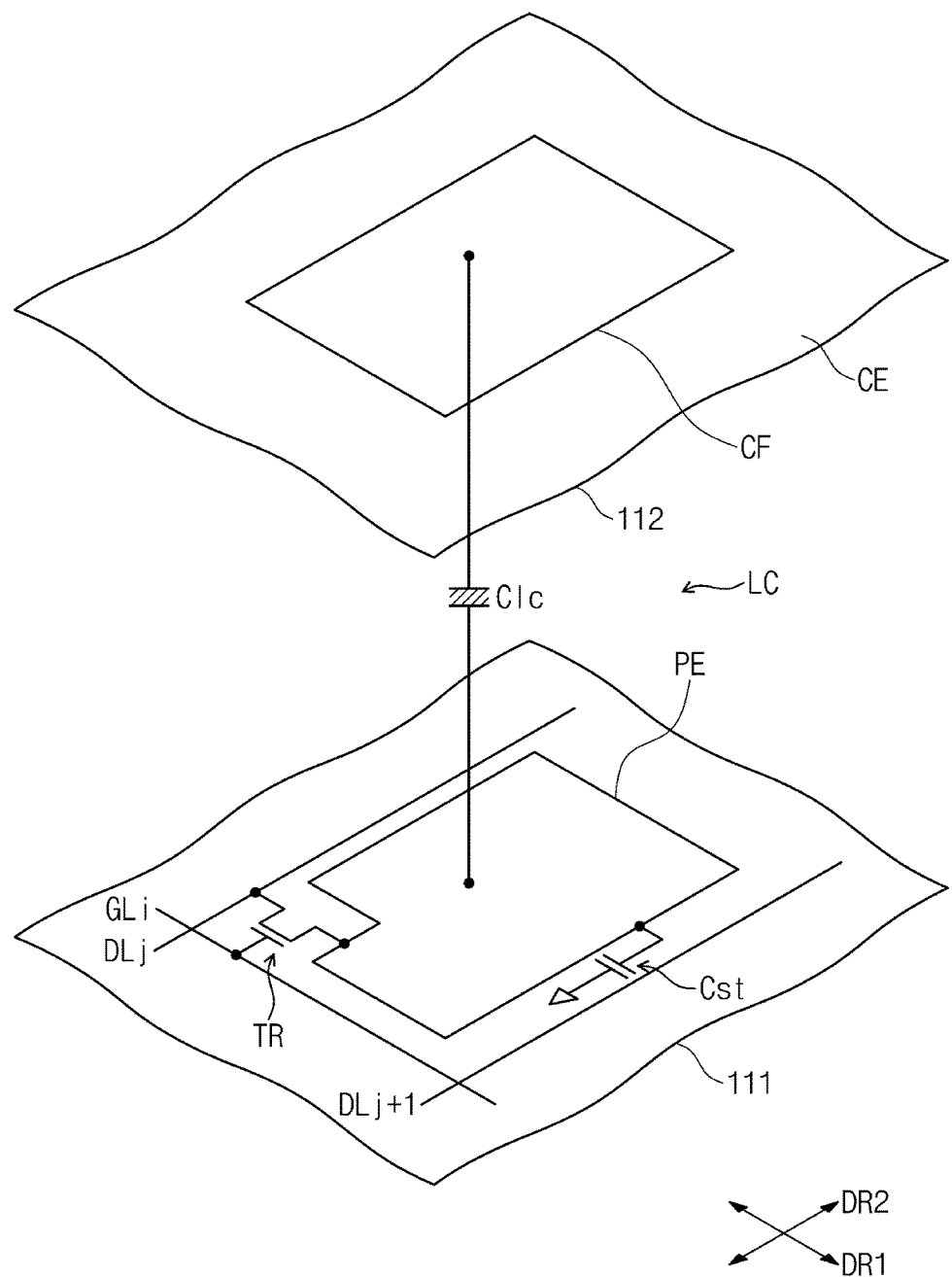
FIG. 2 is a perspective view illustrating an embodiment of a pixel of the display device in FIG. 1.

FIG. 2 is a perspective view illustrating an embodiment of a pixel of the display device in FIG. 1.

FIG. 2 illustrates an embodiment of a pixel PX connected to a gate line GLi and a data line DLj among the plurality of gate lines GL1 to GLm, and the plurality of data lines DL1 to DLn of FIG. 1, for the purpose of ease and convenience in explanation. A data line DLj+1 may be disposed adjacent to the data line DLj in the first direction DR1. Even though not shown in the drawings, elements of other pixels PX of the display panel 110 (refer to FIG. 1) may be the same as the pixel PX illustrated in FIG. 2.

Referring to FIG. 2, the pixel PX includes a transistor TR connected to the gate line GLi and the data line DLj, a liquid crystal capacitor Clc connected to the transistor TR, and a storage capacitor Cst connected in parallel to the liquid crystal capacitor Clc. In certain embodiments, the storage capacitor Cst may be omitted. Here, 'i' and 'j' are natural numbers.

The transistor TR may be disposed on the first substrate 111. The transistor TR includes a gate electrode as one terminal connected to the gate line GLi, a source electrode as a second terminal connected to the data line DLj, and a drain electrode as a third terminal connected to the liquid crystal capacitor Clc and to the storage capacitor Cst.

The liquid crystal capacitor Clc includes a pixel electrode PE disposed on the first substrate 111, a common electrode CE disposed on the second substrate 112, and the liquid crystal layer LC disposed between the pixel electrode PE and the common electrode CE. The liquid crystal layer LC may act as a dielectric material within the liquid crystal capacitor Clc. The pixel electrode PE is connected to the drain electrode of the transistor TR.

In FIG. 2, the pixel electrode PE has a non-slit (e.g., solid) structure in the top plan view. However, embodiments of the invention are not limited thereto. In certain embodiments, the pixel electrode PE may have a slit structure that includes a cross-shaped stem portion and a plurality of branch portions which radially extend from the stem portion.

The common electrode CE may be disposed entirely on the second substrate 112 such as in a solid or plate shape. However, embodiments of the invention are not limited thereto. In certain embodiments, the common electrode CE may be disposed on the first substrate 111 within the first display substrate along with the pixel electrode PE thereof. In this case, at least one of the pixel electrode PE or the common electrode CE within the same first display substrate may include a slit.

The storage capacitor Cst may include the pixel electrode PE, a storage electrode (not shown) branched from a storage line (not shown), and an insulating layer disposed between the pixel electrode PE and the storage electrode. The storage line may be disposed on the first substrate 111 and may be formed simultaneously with the gate lines GL1 to GLm in the same layer. The storage electrode may partially overlap with the pixel electrode PE for forming the storage capacitor Cst.

The pixel PX may further include a color filter CF displaying one of a red color, a green color and a blue color. In an embodiment, for example, the color filter CF may be disposed on the second substrate 112 within the second display substrate, as illustrated in FIG. 2. However, embodiments of the invention are not limited thereto. In certain embodiments, the color filter CF may be disposed on the first substrate 111 within the first display substrate.

The transistor TR is turned-on in response to the gate signal provided through the gate line GLi. The data voltage received through the data line DLj is provided to the pixel electrode PE of the liquid crystal capacitor Clc through the transistor TR which is turned-on. A common voltage is applied to the common electrode CE.

An electric field is generated between the pixel electrode PE and the common electrode CE by a difference in voltage level between the data voltage and the common voltage. Liquid crystal molecules of the liquid crystal layer LC are driven by the electric field generated between the pixel electrode PE and the common electrode CE. A light transmittance of the display panel 110 may be controlled by the liquid crystal molecules driven by the electric field, thereby displaying an image.

A storage voltage having a constant voltage level may be applied to the storage line. However, embodiments of the invention are not limited thereto. In certain embodiments, the common voltage may be applied to the storage line. The storage capacitor Cst may supplement a voltage charged in the liquid crystal capacitor Clc.

Figure 3:
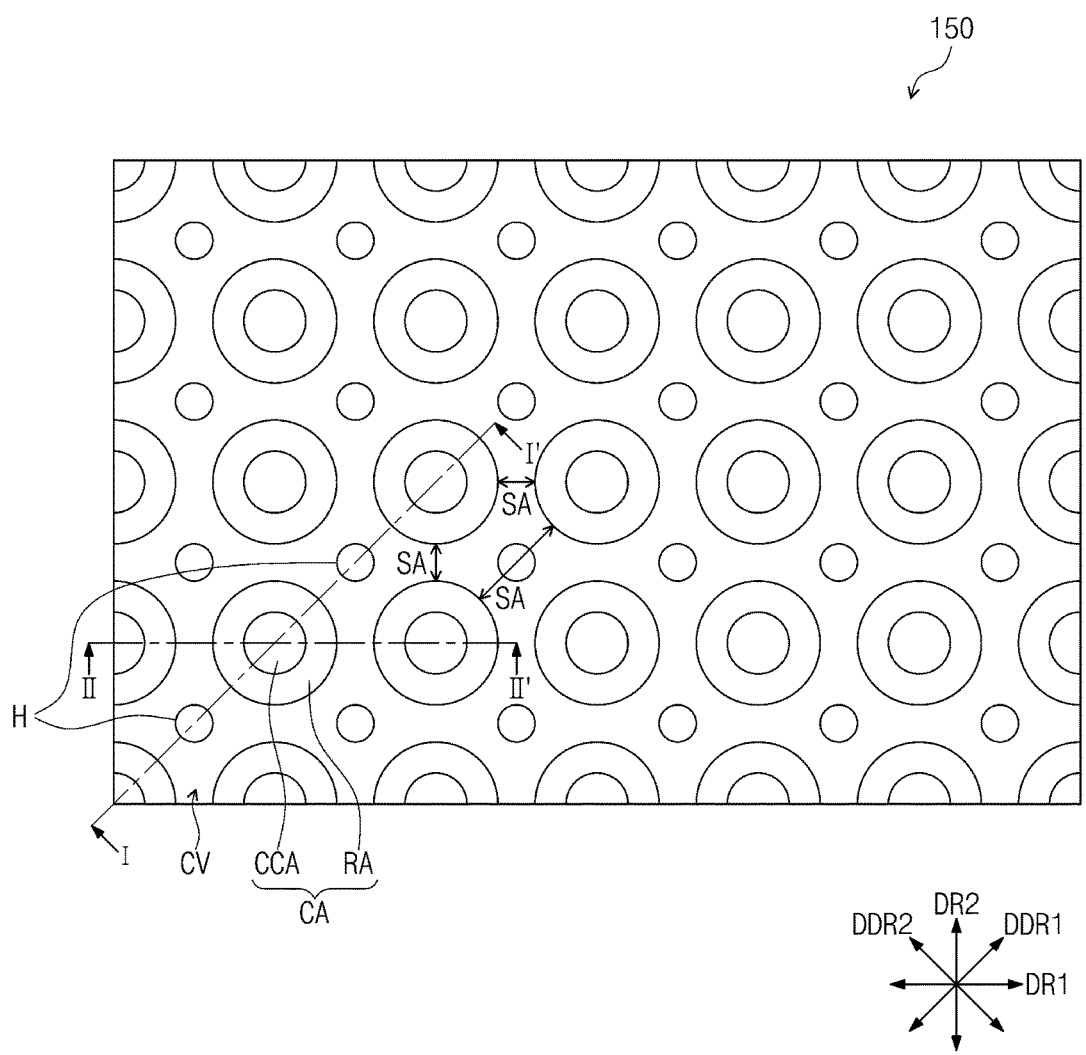
FIG. 3 is a top plan view illustrating an embodiment of an optical member of the backlight assembly in FIG. 1.
Figure 4:
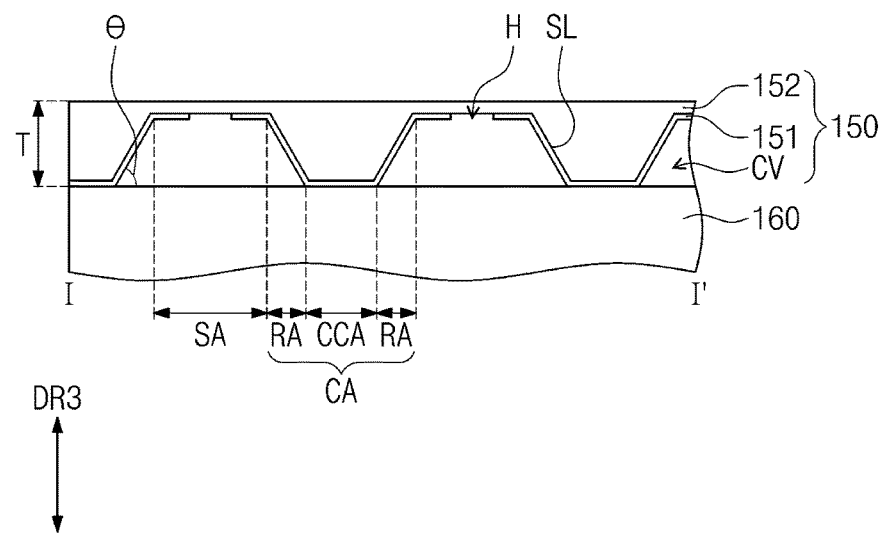
FIG. 4 is a cross-sectional view of the backlight assembly taken along line I-I' of FIG. 3.
Figure 5:
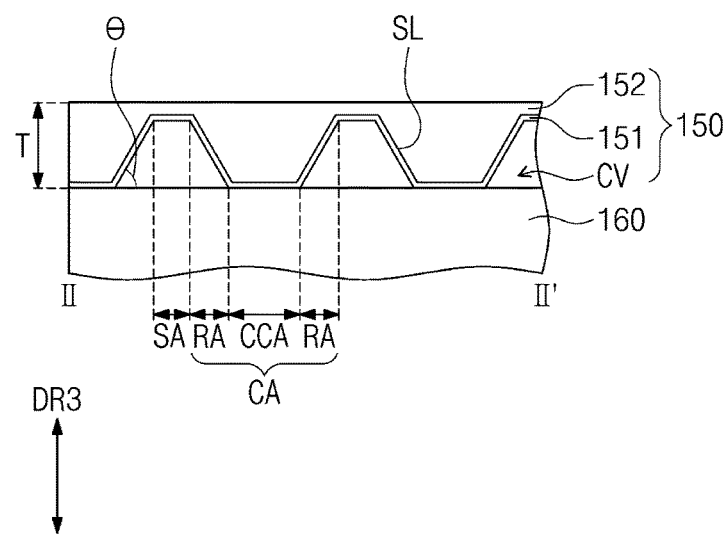
FIG. 5 is a cross-sectional view of the backlight assembly taken along line II-II' of FIG. 3.

FIG. 3 is a top plan view illustrating an embodiment of an optical member relative to a light guide plate of the backlight assembly of FIG. 1. FIG. 4 is a cross-sectional view of the backlight assembly taken along line I-I' of FIG. 3. FIG. 5 is a cross-sectional view of the backlight assembly taken along line II-II' of FIG. 3. The optical member and the light guide plate are illustrated in FIGS. 3 through 5 while other elements of the backlight assembly are omitted for convenience of description.

Referring to FIGS. 3, 4 and 5, the optical member 150 includes a first insulating layer 151 disposed on the light guide plate 160 and a second insulating layer 152 disposed on the first insulating layer 151. The first insulating layer 151 may be an inorganic insulating layer including an inorganic material. The second insulating layer 152 may be an organic insulating layer including an organic material. The second insulating layer 152 may define a top surface of the overall optical member 150.

In the top plan view, a top surface of the light guide plate 160 includes a circular area CA provided in plurality and a peripheral area SA around the circular areas CA. The circular areas CA and the collective peripheral area SA define an entirety of the top surface of the light guide plate 160. Each of the circular areas CA includes a central circular area CCA and a ring area RA which surrounds the central circular area CCA. The circular areas CA are arranged in a matrix form along the first direction DR1 and the second direction DR2. The central circular areas CCA have circular shapes in the top plan view, and the ring areas RA have ring shapes in the top plan view.

The first insulating layer 151 of the optical member 150 is in contact with the top surface of the light guide plate 160 at the central circular areas CCA of the circular areas CA. A portion of the first insulating layer 151 is spaced apart in an upward direction from the top surface of the light guide plate 160 by predetermined distances in the ring areas RA and in the peripheral area SA to define a cavity CV provided in plurality and each collectively at the ring area RA and the peripheral area SA. The cavity CV may be an area absent materials of both the first and second insulating layers 151 and 152.

The second direction DR2 may be perpendicular to the first direction DR1. In addition, directions intersecting the first and second directions DR1 and DR2 and disposed in the plane parallel to the plane defined by the first and second directions DR1 and DR2 are defined hereinafter as diagonal directions DDR1 and DDR2. The diagonal directions DDR1 and DDR2 include a first diagonal direction DDR1 forming an angle of about 45 degrees with the first direction DR1 in a counterclockwise direction and a second diagonal direction DDR2 forming an angle of about 135 degrees with the first direction DR1 in the counterclockwise direction.

A hole H penetrating the first insulating layer 151 may be provided in plurality defined in predetermined areas of the peripheral area SA. In more detail, the plurality of holes H penetrating a thickness of the first insulating layer 151 may be defined in first predetermined areas and in second predetermined areas. Each of the first predetermined areas is defined in a central area between the ring areas RA adjacent to each other in the first diagonal direction DDR1, and each of the second predetermined areas is defined in a central area between the ring areas RA adjacent to each other in the second diagonal direction DDR2. For purpose of explanation, FIG. 3 labels holes H in first predetermined areas which are defined in a central area between ring areas RA adjacent to each other in the first diagonal direction DDR1, where line I-I' is extended in the first diagonal direction DDR1.

In cross-section, the first insulating layer 151 extends at a predetermined angle θ from the top surface of the light guide plate 160 in each of the ring areas RA. The first insulating layer 151 forming the predetermined angle θ with the top surface of the light guide plate 160 in each of the ring areas RA defines an inclined surface SL. The inclined surface SL of the first insulating layer 151 may form an angle of about 60 degrees to about 70 degrees (e.g., an angle of about 60 degrees) with the top surface of the light guide plate 160.

Portions of the first insulating layer 151 contacting the top surface of the light guide plate 160 may correspond to or define the central circular areas CCA of the light guide plate

160. Portions of the first insulating layer 151 defining the inclined surface SL may correspond to or define the ring areas RA of the light guide plate 160. Portions of the first insulating layer 151 furthest from the top surface of the light guide plate 160 and in which the holes H are defined correspond to or define the peripheral areas SA of the light guide plate 160.

The second insulating layer 152 is disposed on the first insulating layer 151 to cover the first insulating layer 151 and the holes H defined therethrough. The second insulating layer 152 may be a planarized layer, and thus a top surface of the second insulating layer 152 may be flat.

A total thickness T of the optical member 150 in the third direction DR3 may correspond to a distance between the top surface of the second insulating layer 152 and a bottom surface of the first insulating layer 151 disposed in the central circular area CCA. The thickness T may be a maximum distance between the top surface of the second insulating layer 152 and a bottom surface of the first insulating layer 151 disposed in the central circular area CCA. The thickness T of the optical member 150 may range from about 3.5 micrometers (μm) to about 10 micrometers (μm).

A refractive index of the cavity CV is substantially equal to a refractive index of air, and a refractive index of the light guide plate 160 is greater than the refractive index of the cavity CV. The refractive index of the light guide plate 160 is equal to a refractive index of the second insulating layer 152, and a refractive index of the first insulating layer 151 is greater than the refractive index of the second insulating layer 152.

Figure 6:
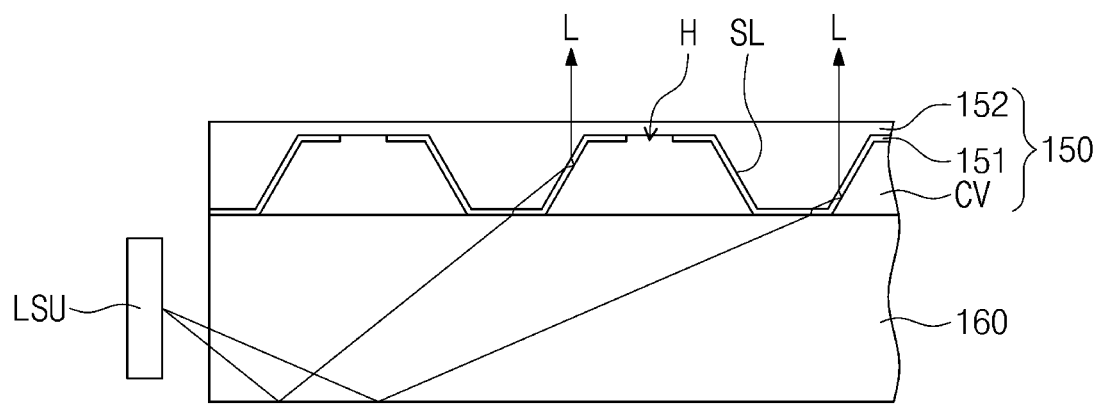
FIG. 6 is a cross-sectional view illustrating refraction of light in an embodiment of a backlight assembly including a light guide plate and an optical member.

FIG. 6 is a cross-sectional view illustrating refraction of light in an embodiment of a backlight assembly including a light guide plate and an optical member. The optical member, light guide plate and light source unit are illustrated in the cross-sectional view of FIG. 6 while other elements of the backlight assembly are omitted for convenience of description.

Referring to FIG. 6, light L generated by the light source unit LSU is provided to the light guide plate 160. The light L provided to the light guide plate 160 is guided within the light guide plate 160 to be provided to the optical member 150 through a light exiting surface of the light guide plate 160, by a total reflection phenomenon.

The light L provided to the optical member 150 to be incident on the first insulating layer 151 is refracted at the first insulating layer 151 having a greater refractive index than the light guide plate 160 and at the second insulating layer 152 having a smaller refractive index than the first insulating layer 151, to pass through each of the first insulating layer 151 and the second insulating layer 152 and exit the optical member 150 toward the display panel (refer to 110 in FIG. 1). Light passing through the second insulating layer 152 adjacent to the cavity CV may be reflected at an interface between the cavity CV and the second insulating layer 152 by the total reflection phenomenon.

The light refracted at the first and second insulating layers 151 and 152 of the optical member 150 may be outputted from the optical member 150 in a state where a traveling direction of the outputted light is closer to the third direction DR3 than an original direction from the light guide plate 160. In other words, the optical member 150 may condense and output the light L provide from the light guide plate 160 in the upper direction toward the display panel 110.

A brightness distribution of the light L provided to the display panel 110 may become more uniform as the traveling direction of the light L becomes closer to the third direction DR3. In other words, a light-emitting efficiency of the backlight unit BLU including one or more embodiment of the optical member 150 may be improved. The light outputted from the optical member 150 may travel in the upper direction toward the display panel 110 so as to be provided to the display panel 110 with the uniform brightness distribution.

If separate and individual sheets such as a diffusion sheet, a prism sheet and a protection sheet are used as a conventional optical sheet instead of one or more embodiment of the optical member 150 according to the invention, an overall thickness of a conventional display device may be relatively large owing to the conventional optical sheet having a total thickness of about 0.5 mm.

However, one or more embodiment of the optical member 150 according to the invention may condense the light L provided from the light guide plate 160 owing to the first and second insulating layers 151 and 152 defining the cavity CV. In addition, the optical member 150 may have an overall thickness of about 3.5 micrometers (μm) to about 10 micrometers (μm). In other words, one or more embodiment of the optical member 150 according to the invention may still condense the light L like the conventional optical sheet but may have a smaller overall thickness than the conventional optical sheet.

Thus, one or more embodiment of the backlight unit BLU and the display device 100 including the same according to the invention may include the above-described optical member 150 which improves the light-emitting efficiency and has a relatively slim structure. As a result, it is possible to reduce the overall thickness of the backlight unit BLU and the overall thickness of the display device 100 including the same.

Figure 7:
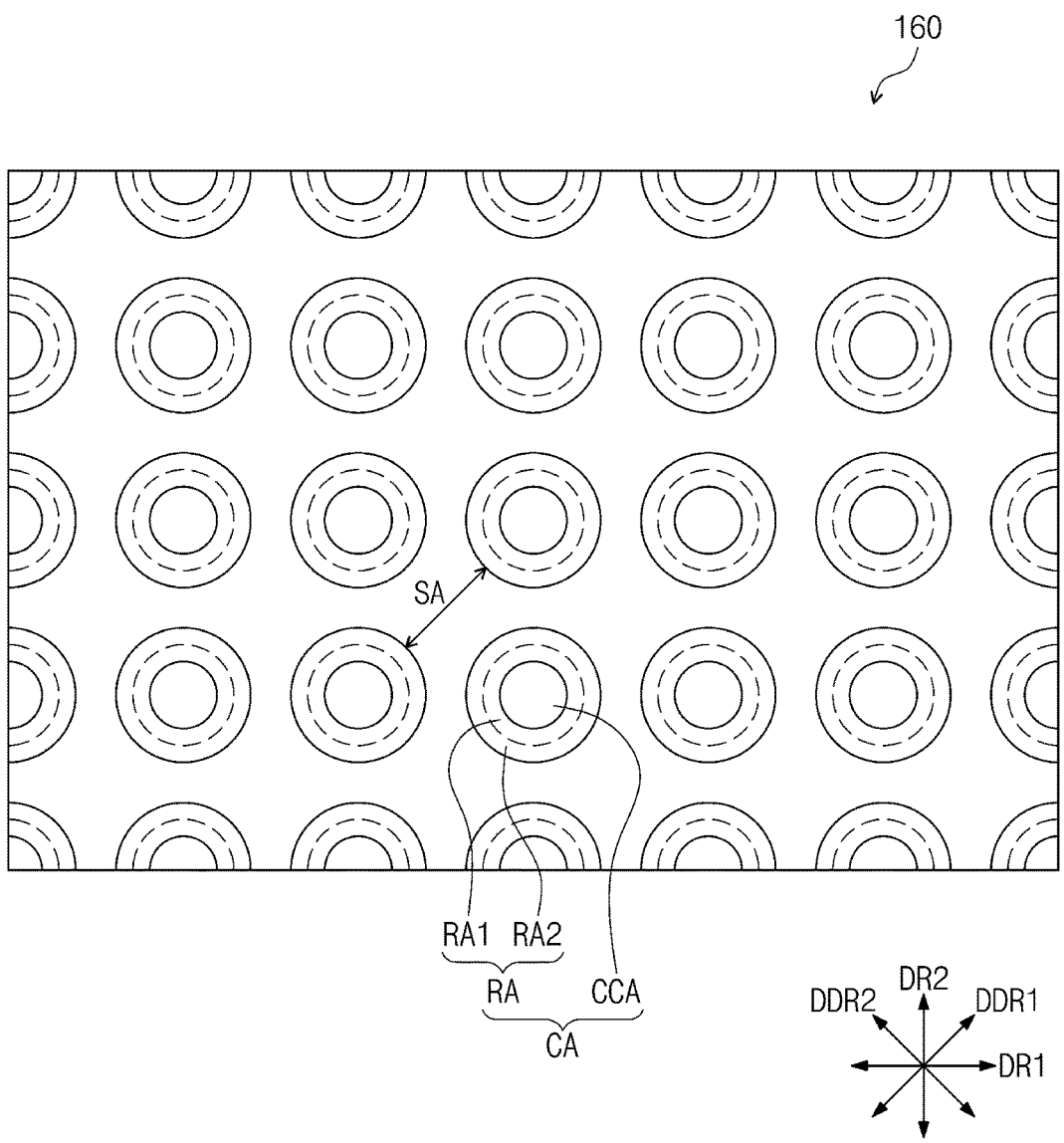

FIG. 7 is a top plan view and FIGS. 8A to 14A, and 8B to 14B are cross-sectional views illustrating an embodiment of a method of fabricating a backlight unit, according to the invention. The optical member and the light guide plate are illustrated in FIGS. 7 through 14B, respectively, while other elements of the backlight assembly are omitted for convenience of description.

For the purpose of ease and convenience in explanation, FIGS. 8A to 14A are cross-sectional views corresponding to the cross-sectional view of the line I-I' illustrated in FIG. 4 to illustrate the method of fabricating the backlight unit BLU, and FIGS. 8B to 14B are cross-sectional views corresponding to the cross-sectional view of the line II-II' illustrated in FIG. 5 to illustrate the method of fabricating the backlight unit BLU.

Referring to FIG. 7, the light guide plate 160 is prepared. As described above, the top surface of the light guide plate 160 includes the circular area CA provided in plural and the peripheral area SA, and each of the circular areas CA collectively includes the central circular area CCA and the ring area RA. Each ring area RA includes a first ring area RA1 surrounding the central circular area CCA and a second ring area RA2 surrounding the first ring area RA1. For the purpose of ease and convenience in explanation, the first ring areas RA1 are illustrated by dotted lines in FIG. 7. Even though not shown in FIG. 7, the light source LS may be disposed to be adjacent to one side surface of the light guide plate 160 in the top plan view.

Figure 8A:
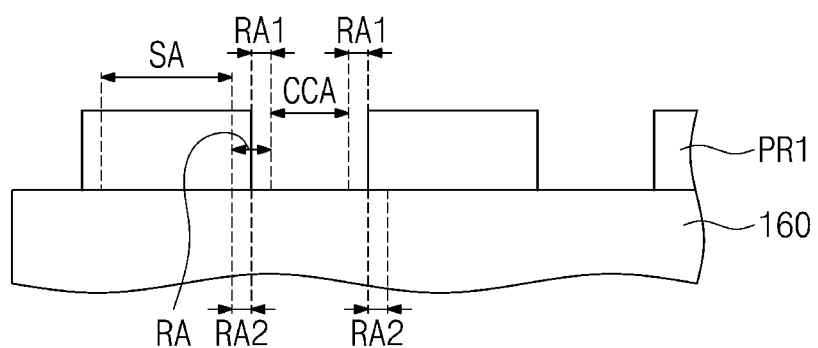
Figure 8B:
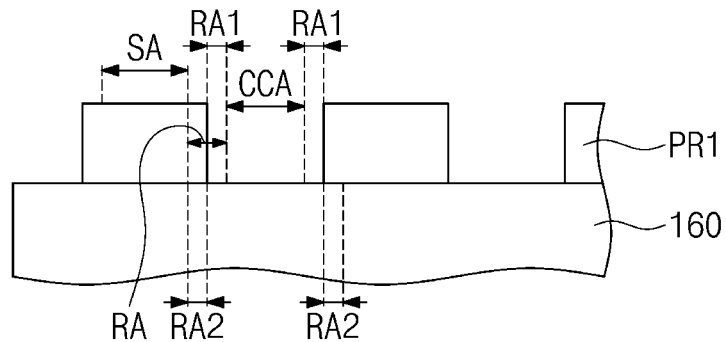

Referring to FIGS. 8A and 8B, a first photoresist pattern PR1 including or formed of an organic material is formed on the top surface of the light guide plate 160. The first photoresist pattern PR1 is formed in the second ring areas RA2 and the peripheral area SA. Even though not shown in the drawings, forming the first photoresist pattern PR1 may include a photosensitive resin material (or a photoresist material) is formed on an entire top surface of the light guide plate 160, and then, a photomask exposing the photosensitive resin material of the central circular areas CCA and the first ring areas RA1 is disposed over the photosensitive resin.

An exposure process is performed on the photosensitive resin material of the central circular areas CCA and the first ring areas RA1 by using the photomask as a mask. The photosensitive resin material of the central circular areas CCA and the first ring areas RA1 may be removed by a developing solution, and thus the first photoresist pattern PR1 may be formed in the second ring areas RA2 and the peripheral area SA as shown in FIGS. 8A and 8B. The photosensitive resin for forming the first photoresist pattern PR1 may be a positive photoresist.

Figure 9A:
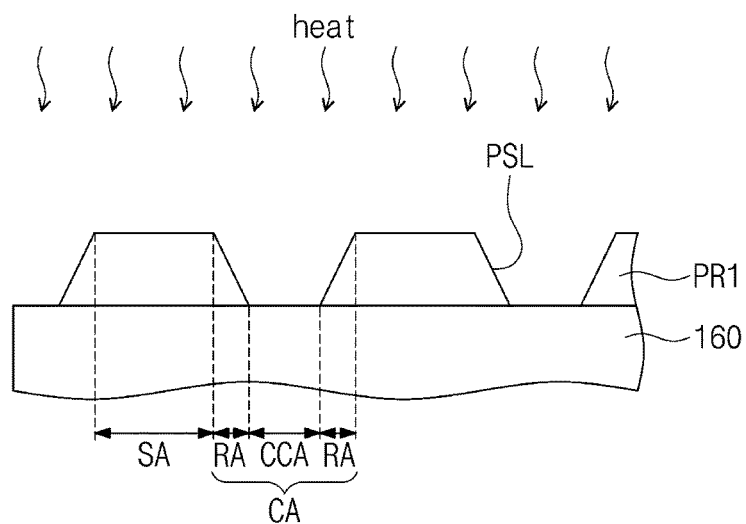
Figure 9B:
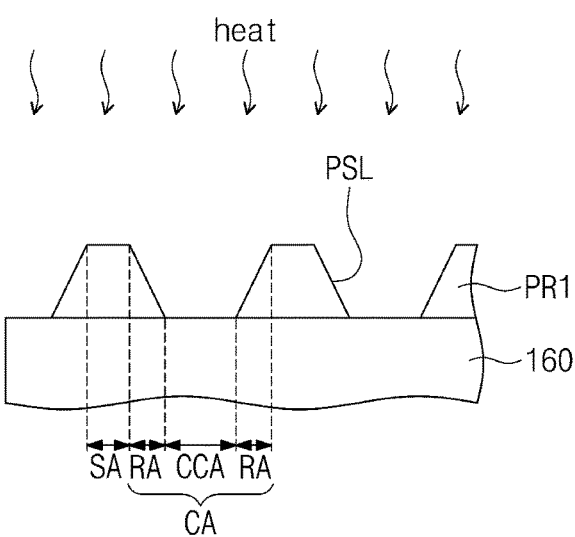

Referring to FIGS. 9A and 9B, a hardening process is performed on the first photoresist pattern PR1. In the hardening process, a temperature of about 130 degrees Celsius to about 149 degrees Celsius is applied to the first photoresist pattern PR1. When the temperature of about 130 degrees Celsius to about 149 degrees Celsius is applied to the first photoresist pattern PR1 formed of the positive photoresist, the first photoresist pattern PR1 in the second ring areas RA2 may flow down toward the light guide plate 160 such that a side surface of the processed first photoresist pattern PR1 may have an inclined surface PSL defined by a portion of the first photoresist pattern PR1 at the overall ring area RA. The top surface of the light guide plate 160 is exposed at the end of the inclined surface PSL.

As a result, a bottom surface of the first photoresist pattern PR1 may be formed commonly in the ring areas RA and the peripheral area SA, and a top surface of the first photoresist pattern PR1 may be formed in the peripheral area SA. That is, the top surface of the first photoresist pattern PR1 in the peripheral area SA may terminate at the ring areas RA. In addition, when the temperature of about 130 degrees Celsius to about 149 degrees Celsius is applied to the first photoresist pattern PR1, the inclined surface PSL of the first photoresist pattern PR1 may be formed at an angle of about 60 degrees to about 70 degrees relative to the top surface of the light guide plate 160.

Figure 10A:
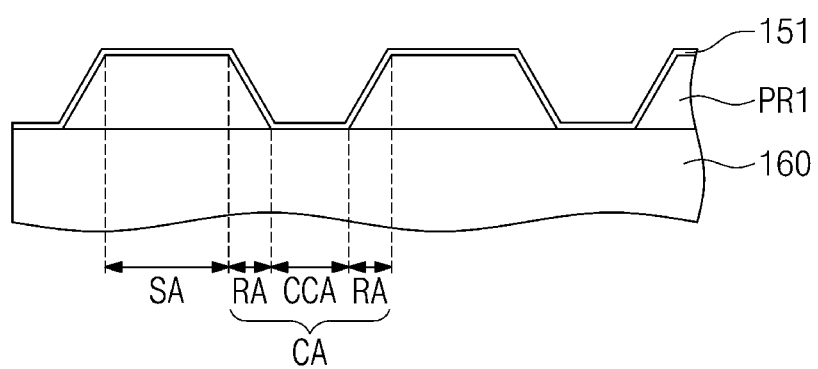
Figure 10B:
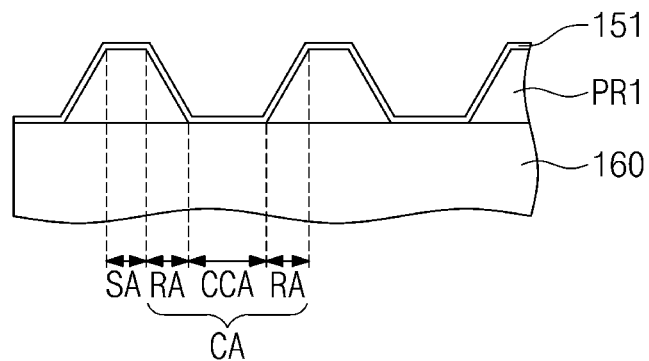

Referring to FIGS. 10A and 10B, a first insulating layer 151 including or formed from an inorganic insulating material layer is formed on the exposed portion of the light guide plate 160 and on the first photoresist pattern PR1. The inorganic insulating material layer is commonly disposed on the light guide plate 160 and on the first photoresist pattern PR1 to form the first insulating layer 151 of FIGS. 10A and 10B.

Figure 11A:
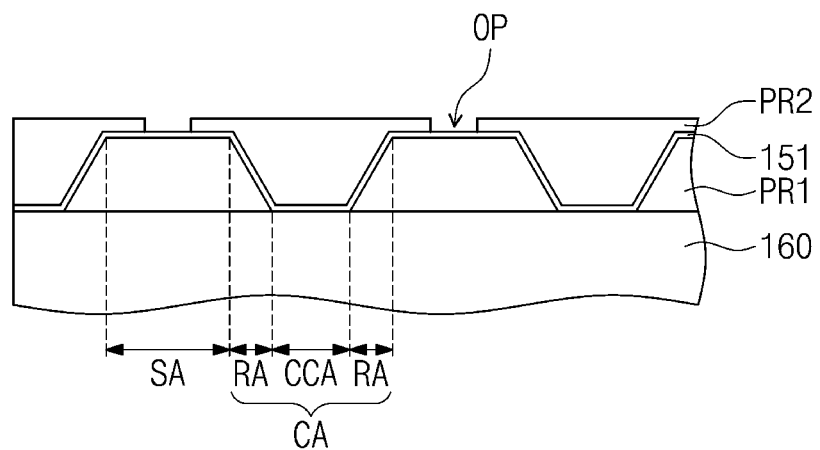
Figure 11B:
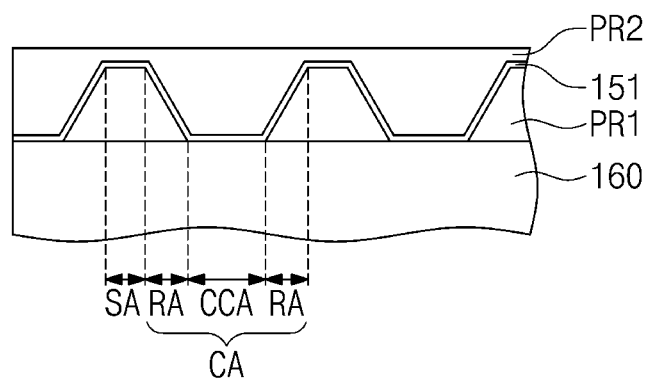

Referring to FIGS. 11A and 11B, a second photoresist material layer (not shown) is formed on the first insulating layer 151 such as on an entirety thereof, and portions of the second photoresist material layer are removed from predetermined areas of the peripheral area SA to define openings OP and form the second photoresist pattern PR2 having the openings OP. The openings OP of the second photoresist pattern PR2 may be substantially overlapped with areas of the first insulating layer 151 at which the holes H will be formed. Portions of the first insulating layer 151 may be exposed by the openings OP in the second photoresist pattern PR2.

Figure 12A:
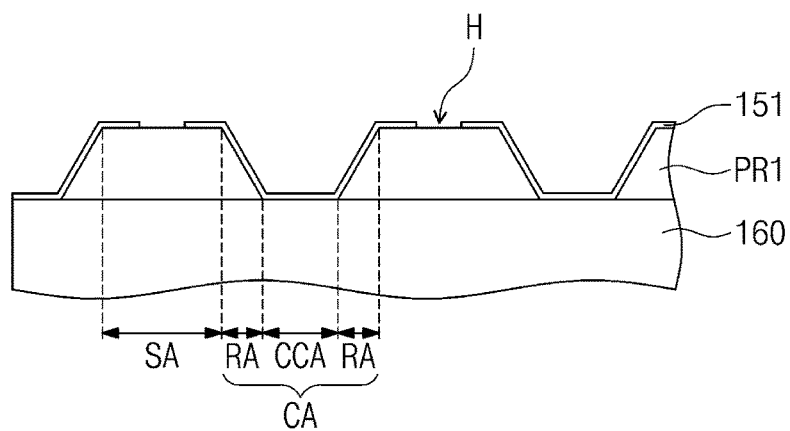
Figure 12B:
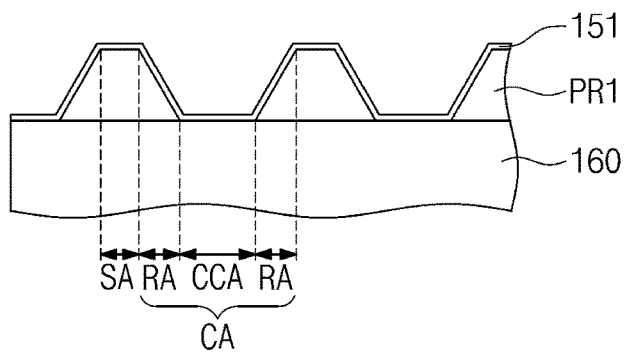

Referring to FIGS. 12A and 12B, portions of the first insulating layer 151, which overlap with the openings OP in the second photoresist pattern PR2, may be removed using the second photoresist pattern PR2 having the openings OP as a mask. The portions of the first insulating layer 151 exposed by the openings OP may be removed using a dry etching process.

A plurality of holes H in the first insulating layer 151 may be defined by the removal of the portions of the first insulating layer 151 exposed by the openings OP of the second photoresist pattern PR2. The second photoresist pattern PR2 may be removed after the holes H are defined in the first insulating layer 151. Diameters of the holes H may be greater than 0 micrometer (μm) and less than about 5 micrometers (μm). The underlying first photoresist pattern PR1 is exposed by the holes H formed in the first insulating layer 151.

Figure 13A:
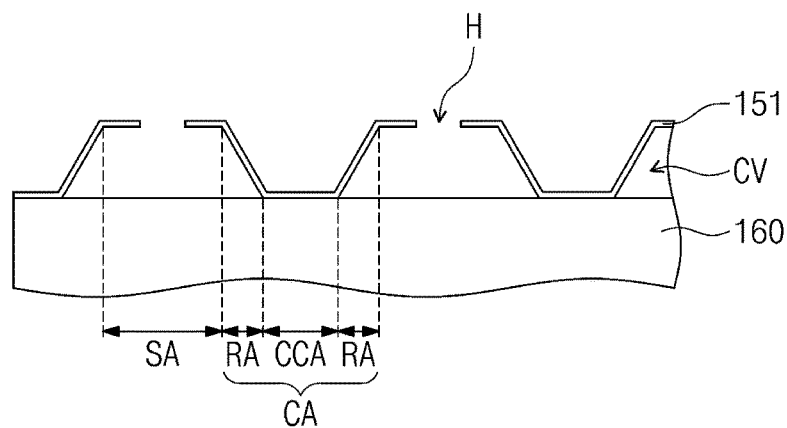
Figure 13B:
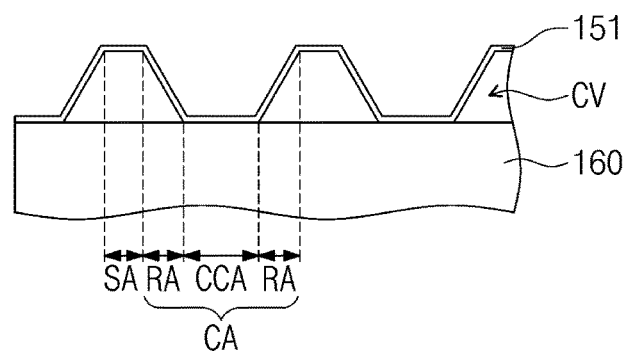

Referring to FIGS. 13A and 13B, an etching solution may be provided to the first photoresist pattern PR1 through the holes H, thereby removing the first photoresist pattern PR1. In other words, the holes H may act as paths through which the etching solution for removing the first photoresist pattern PR1 is provided to the first photoresist pattern PR1.

A cavity CV is defined respectively in the ring areas RA and the peripheral area SA by the removal of the first photoresist pattern PR1 underlying the first insulating layer 151. In other words, with the first photoresist pattern PR1 removed, the first insulating layer 151 is spaced apart from and extended upward from the top surfaced of the light guide plate 160 by predetermined distances in the ring areas RA and the peripheral area SA to define the cavity CV, while the first insulating layer 151 is in contact with the top surface of the light guide plate 160 in the central circular areas CCA. In addition, an inclined surface SL of the first insulating layer 151 in each of the ring areas RA may form an angle of about 60 degrees to about 70 degrees with the top surface of the light guide plate 160.

Figure 14A:
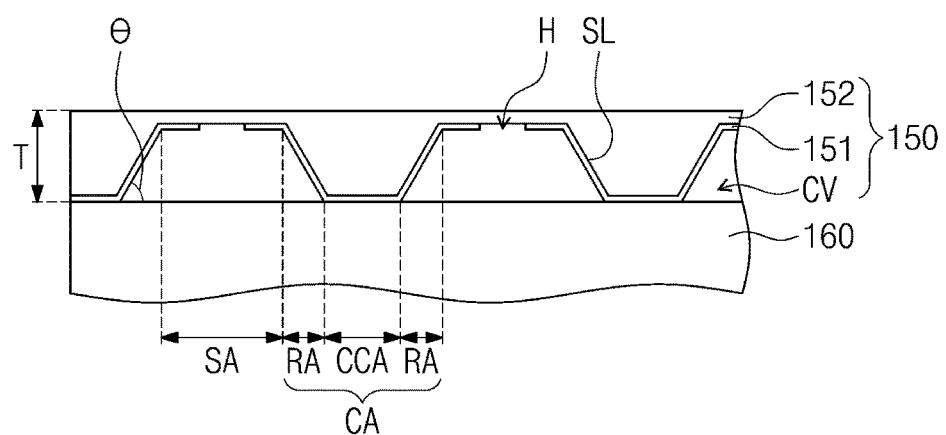
Figure 14B:
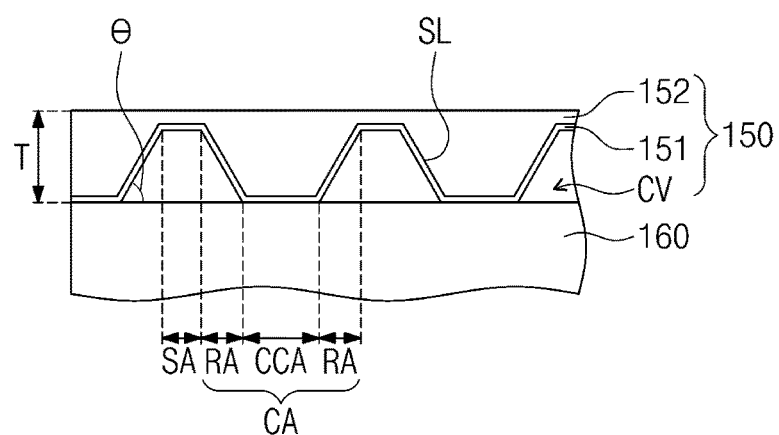

Referring to FIGS. 14A and 14B, a second insulating layer 152 as an organic insulating material layer is formed on the first insulating layer 151. The second insulating layer 152 is formed to cover the holes H. The material for forming the second insulating layer 152 has a viscosity of about 200 centipoise (cP) or more. When the second insulating layer 152 has the viscosity of about 200 cP or more and the diameters of the holes H are smaller than about 5 μm, the second insulating layer 152 may not travel into the cavity CV through the holes H and may remain above the holes H in the first insulating layer 151.

Thus, when the second insulating layer 152 has the viscosity of about 200 cP or more and the diameters of the holes H are smaller than about 5 μm, the second insulating layer 152 may not be injected into the holes H but may cover the holes H as shown in FIGS. 14A and 4. As a result, the backlight unit BLU including one or more embodiment of the optical member 150 may be fabricated.

The optical member 150 inclusive of the first and second insulating layers 151 and 152 may have the overall thickness of about 3.5 μm to about 10 μm and may condense the light L provided from the light guide plate 160. Thus, the backlight unit BLU including such optical member 150 may have the improved light-emitting efficiency and a relatively slim structure. In other words, the overall thickness of the backlight unit BLU may be reduced.

One or more embodiment of the backlight unit and the display device including the same according to the invention may include the optical member having improved light-emitting efficiency and having the relatively slim structure. Thus, it is possible to reduce the overall thickness of the backlight unit and the overall thickness of the display device including such backlight unit.

While the invention has been described with reference to embodiments, it will be apparent to those skilled in the art that various changes and modifications may be made without departing from the spirit and scope of the invention. Therefore, it should be understood that the above embodiments are not limiting, but illustrative. Thus, the scope of the invention are to be determined by the broadest permissible interpretation of the following claims and their equivalents, and shall not be restricted or limited by the foregoing description.

What is claimed is:

1. A backlight unit comprising:
a light source which generates light;
a light guide plate which guides the light from the light source in an upper direction toward a display panel which displays an image with the light; and
an optical member which receives the light from the light guide plate and condenses the light provided from the light guide plate in the upper direction toward the display panel,
wherein a top surface of the light guide plate includes a plurality of circular areas spaced apart from each other and a peripheral area which is around the circular areas,
wherein in a top plan view, each of the circular areas of the light guide plate includes a central circular area and a ring area which surrounds the central circular area, and
wherein the optical member comprises:
a first insulating layer disposed on the light guide plate, the first insulating layer spaced apart in the upper direction from the top surface of the light guide plate by a predetermined distance at the ring areas and at the peripheral area of the light guide plate to define a plurality of cavities; and
a second insulating layer disposed on the first insulating layer.

2. The backlight unit of claim 1, wherein the first insulating layer spaced apart from the top surface of the light guide plate at the ring areas and at the peripheral area thereof extends toward the light guide plate to be in contact with the top surface of the light guide plate at the central circular areas thereof.

3. The backlight unit of claim 1,
wherein the first insulating layer includes an inorganic material,
wherein the second insulating layer includes an organic material, and
wherein a top surface of the second insulating layer is flat.

4. The backlight unit of claim 1,
wherein a plurality of holes penetrates the first insulating layer at predetermined areas of the peripheral area of the light guide plate to respectively expose the plurality of cavities, and
wherein the second insulating layer disposed on the first insulating layer commonly covers the plurality of holes which penetrates the first insulating layer.

5. The backlight unit of claim 4, wherein in the top plan view, the circular areas are arranged in a first direction and a second direction which intersects the first direction.

6. The backlight unit of claim 5,
wherein in a plane is defined by the first and second directions,
a first diagonal direction forms an angle of about 45 degrees with the first direction in a counterclockwise direction, and
a second diagonal direction forms an angle of about 135 degrees with the first direction in the counterclockwise direction,
wherein the holes penetrate the first insulating layer in first predetermined areas and second predetermined areas,
wherein each of the first predetermined areas is defined at a central area between ring areas adjacent to each other in the first diagonal direction, and
wherein each of the second predetermined areas is defined at a central area between ring areas adjacent to each other in the second diagonal direction.

7. The backlight unit of claim 4, wherein the first insulating layer spaced apart from the top surface of the light guide plate includes an inclined surface forming a predetermined angle with the top surface of the light guide plate in each of the ring areas.

8. The backlight unit of claim 7, wherein the inclined surface of the first insulating layer forms an angle of about 60 degrees to about 70 degrees with the top surface of the light guide plate.

9. The backlight unit of claim 4, wherein in the top plan view, a diameter of each of the holes is greater than 0 micrometer and smaller than about 5 micrometers.

10. The backlight unit of claim 9, wherein a viscosity of the second insulating layer commonly covering the plurality of holes is equal to or greater than about 200 centipoise.

11. The backlight unit of claim 1,
wherein a refractive index of the light guide plate is greater than a refractive index of each of the cavities and is equal to a refractive index of the second insulating layer, and
wherein a refractive index of the first insulating layer is greater than the refractive index of the second insulating layer.

12. The backlight unit of claim 1, wherein a total thickness of the optical member inclusive of the first and second insulating layers is equal to or greater than about 3.5 micrometers and equal to or smaller than about 10 micrometers.

13. A display device comprising:
a display panel which displays an image by using light; and
a backlight unit which generates the light and provides the light to the display panel,
wherein the backlight unit comprises:
a light source which generates the light;
a light guide plate which guides the light from the light source in an upper direction toward the display panel; and
an optical member which receives the light from the light guide plate and condenses the light provided from the light guide plate in the upper direction toward the display panel,
wherein in a top plan view, a top surface of the light guide plate includes a plurality of circular areas spaced apart from each other and a peripheral area which is around the circular areas,
wherein each of the circular areas includes a central circular area and a ring area which surrounds the central circular area,
wherein the optical member comprises:
a first insulating layer disposed on the light guide plate, the first insulating layer:
in contact with the top surface of the light guide plate at the central circular areas thereof, and
spaced apart in the upper direction from the top surface of the light guide plate by a predetermined distance at the ring areas and at the peripheral area thereof to define a plurality of cavities; and a second insulating layer disposed on the first insulating layer.

14. The display device of claim 13, wherein a plurality of holes penetrates the first insulating layer at predetermined areas of the peripheral area of the light guide plate to respectively expose the plurality of cavities, and wherein the second insulating layer disposed on the first insulating layer commonly covers the plurality of holes which penetrates the first insulating layer.

15. The display device of claim 14, wherein in each of the ring areas, the first insulating layer spaced apart from the top surface of the light guide plate includes an inclined surface forming an angle of about 60 degrees to about 70 degrees with the top surface of the light guide plate.

16. The display device of claim 14, wherein the first insulating layer includes an inorganic material, wherein the second insulating layer includes an organic material, wherein a diameter of each of the holes is greater than 0 micrometer and smaller than about 5 micrometers, wherein a viscosity of the second insulating layer commonly covering the plurality of holes is equal to or greater than about 200 centipoise, and wherein a total thickness of the optical member inclusive of the first and second insulating layers is equal to or greater than about 3.5 micrometers and equal to or smaller than about 10 micrometers.

17. The display device of claim 13, wherein a refractive index of the light guide plate is greater than a refractive index of each of the cavities and is equal to a refractive index of the second insulating layer, and wherein a refractive index of the first insulating layer is greater than the refractive index of the second insulating layer.

18. A method of fabricating a backlight unit, the method comprising:

preparing a light guide plate including a plurality of central circular areas, a plurality of first ring areas respectively surrounding the central circular areas, a plurality of second ring areas respectively surrounding the first ring areas, and a peripheral area around the second ring areas;

forming a first photoresist pattern on the light guide plate in the second ring areas and in the peripheral area;

applying a temperature of about 130 degrees Celsius to about 149 degrees Celsius to the first photoresist pattern in the second ring areas to form an inclined surface of the first photoresist pattern extended from the peripheral area to be disposed in the first and second ring areas, the inclined surface exposing a top surface of the light guide plate;

forming a first insulating layer on the exposed top surface of the light guide plate, on the first photoresist pattern in the peripheral area and on the inclined surface of the photoresist pattern in the first and second ring areas;

removing portions of the first insulating layer in predetermined areas of the peripheral area to define a plurality of holes in the first insulating layer which expose the first photoresist pattern under the first insulating layer;

providing an etching solution to the first photoresist pattern through the holes to remove the first photoresist pattern and form a plurality of cavities under the first insulating layer; and forming a second insulating layer on the first insulating layer to commonly cover the holes in the first insulating layer, wherein the first insulating layer is spaced apart from the light guide plate by a predetermined distance at the first and second ring areas and at the peripheral area to define the plurality of cavities, and wherein the first insulating layer spaced apart from the light guide plate at the first and second ring areas and at the peripheral area extends toward the light guide plate to be in contact with the exposed top surface of the light guide plate at the central circular areas thereof.

19. The method of claim 18, wherein the first insulating layer includes an inclined surface extended from the peripheral area to be disposed in the first and second ring areas, the inclined surface forming an angle of about 60 degrees to about 70 degrees with the top surface of the light guide plate in the first and second ring areas, wherein a refractive index of the light guide plate is greater than a refractive index of each of the cavities and is equal to a refractive index of the second insulating layer, and wherein a refractive index of the first insulating layer is greater than the refractive index of the second insulating layer.

20. The method of claim 18, wherein the first insulating layer includes an inorganic material, wherein the second insulating layer includes an organic material, wherein a diameter of each of the holes is greater than 0 micrometer and smaller than about 5 micrometers, wherein a viscosity of the second insulating layer commonly covering the plurality of holes is equal to or greater than about 200 centipoise, and wherein a total thickness of the optical member inclusive of the first and second insulating layers is equal to or greater than about 3.5 micrometers and equal to or smaller than about 10 micrometers.

* * * * *